Patented Oct. 11, 1927.

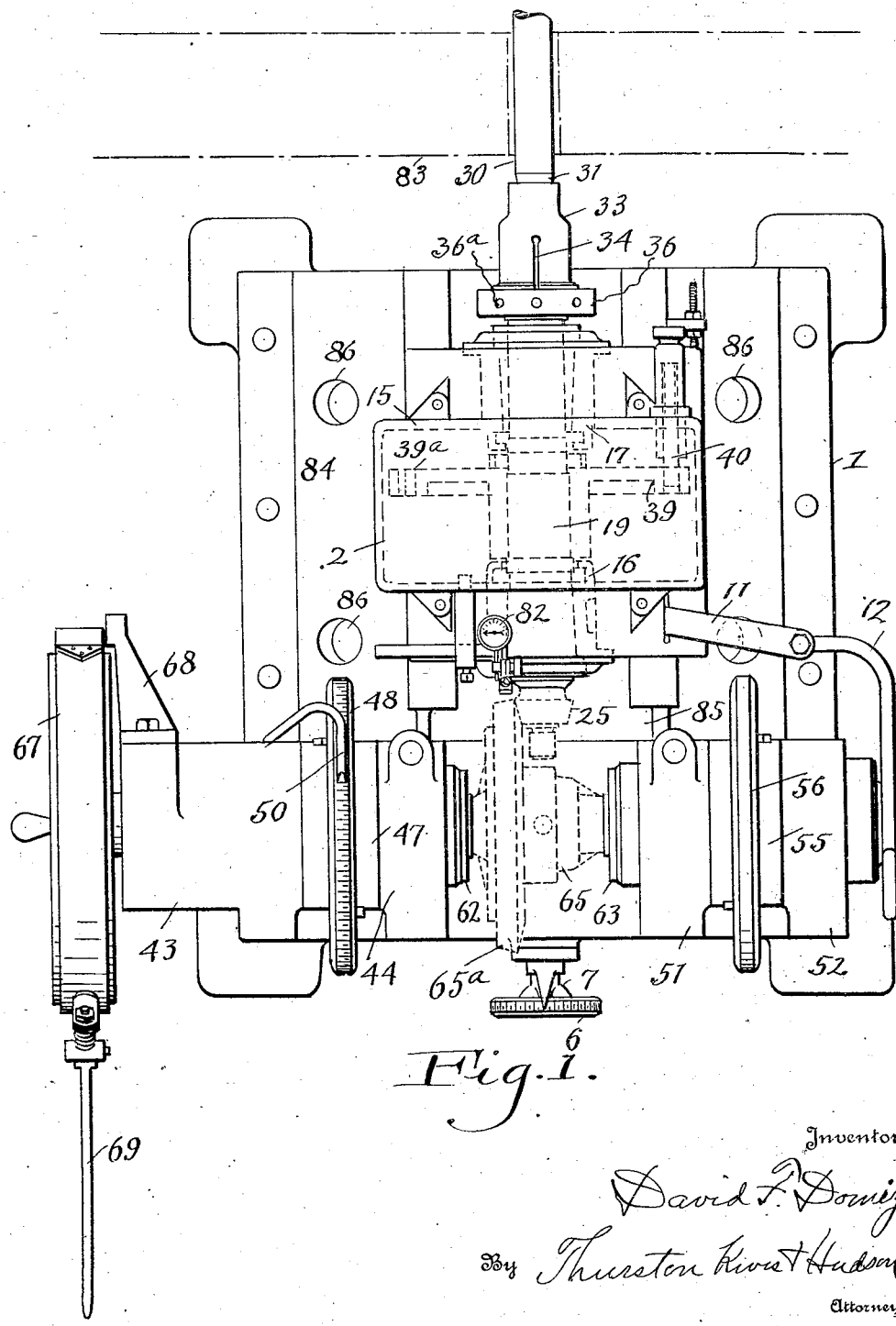

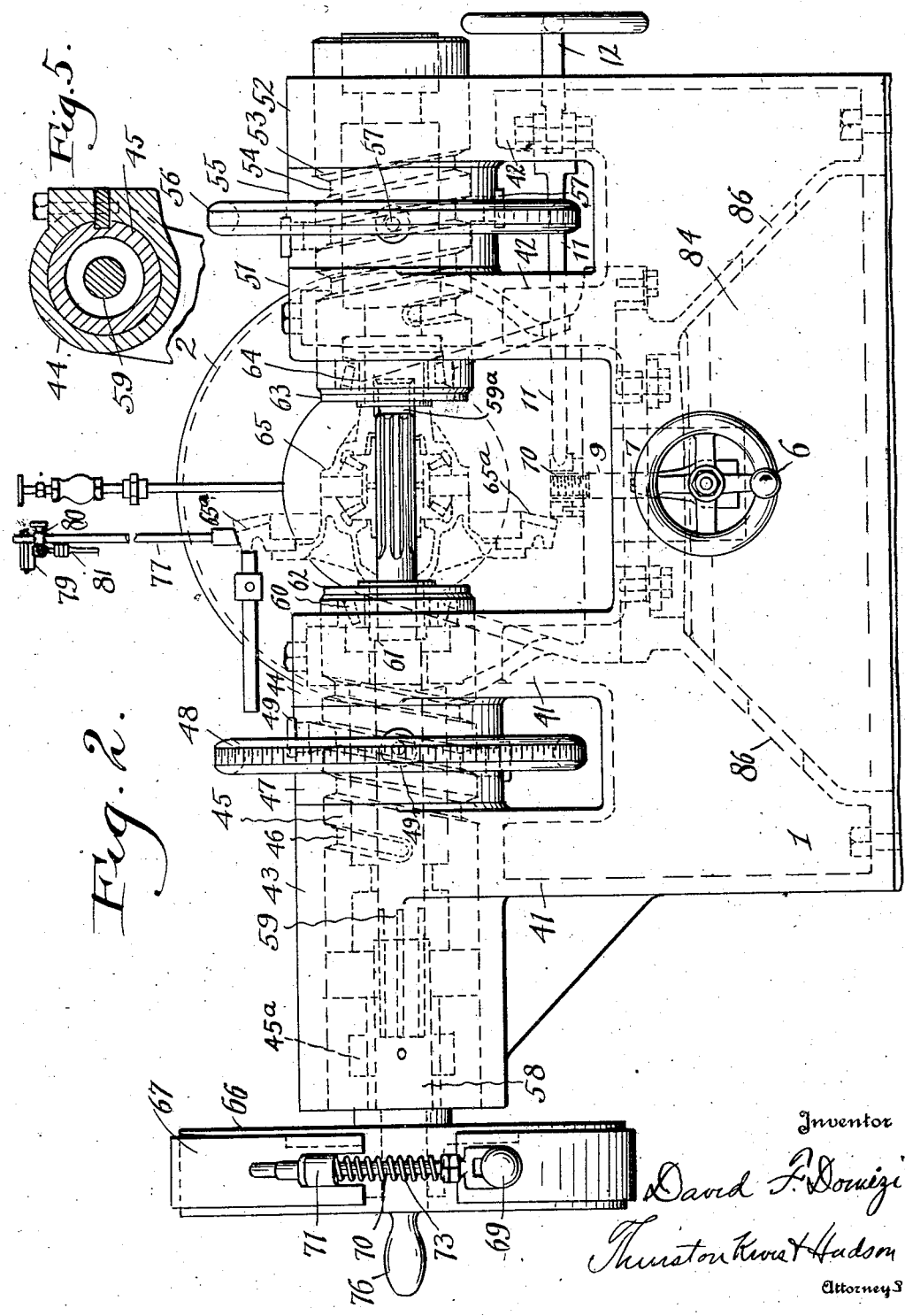

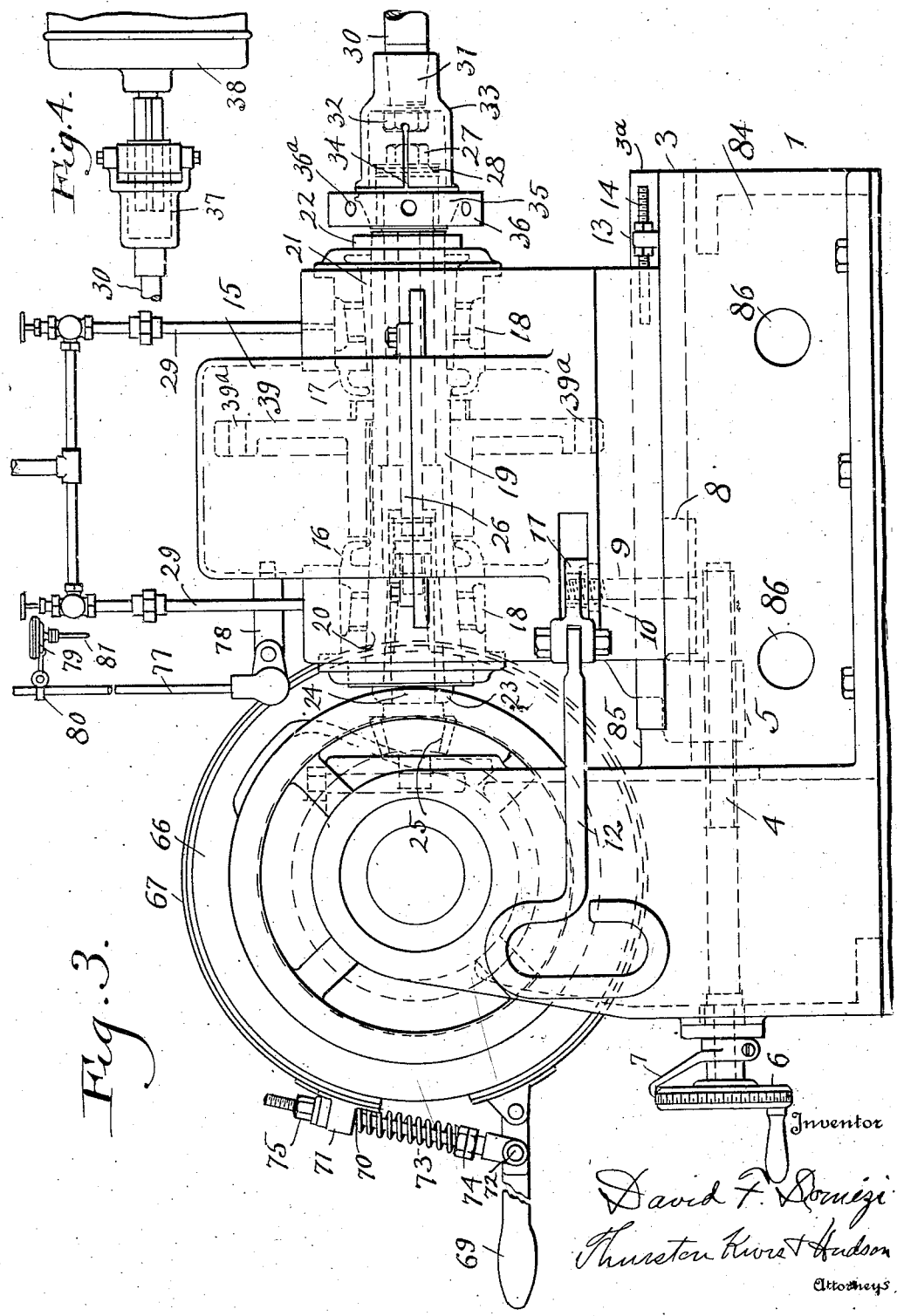

1,644,876

UNITED STATES PATENT OFFICE.

DAVID F. DOMIZI, OF CLEVELAND, OHIO.

GEAR-TESTING MACHINE.

Application filed August 2, 1924. Serial No. 729,667.

This invention relates to gear testing machines for use in the manufacture of gears to facilitate the production of mating gears which will operate smoothly and noiselessly with a minimum of frictional interference.

An object of the present invention is to provide a machine in which the gears to be tested, may be quickly attached to driving and driven spindles and rigidly held in mesh in different adjusted positions with respect to each other and driven at varying speeds and under varying loads to enable the operator to determine by audible and visual tests what further finishing operations are desirable to obtain a perfect intermeshing engagement between a pair of gears being tested.

A further object of the invention is to provide sound intensifying means adjacent the gears being tested to enable the operator to distinctly hear sounds produced by the gears while being driven which would otherwise be indistinguishable.

A further object is to so mount the gear supporting and driving mechanism that there will be no noises which will interfere with the audible test of the gears. A further object is to provide mounting for the gear holding spindles by means of which the spindles may be rigidly held in different adjusted positions without longitudinal play or noise creating vibrations.

With the above and other objects in view the invention may be said to comprise the elements and combinations thereof shown in the accompanying drawings, described in the following description and specifically defined in the appended claims, together with such modifications and variations thereof as will be obvious to those skilled in the art.

Reference should be had to the accompanying drawings forming a part of this specification in which Fig. 1 is a top plan view of the testing machine; Fig. 2 is a front elevation thereof; Fig. 3 is a side elevation thereof; Fig. 4 is a detailed view showing the telescopic flexible connection through which the drive spindle is connected to the motor shaft; Fig. 5 is a sectional detailed view showing the nonrotatable slidable connection between the clamping chuck sleeves and the casings in which they are mounted.

In many kinds of machinery it is very important that the gears which intermesh with each other interfit perfectly so that they will run smoothly with a minimum of vibration and frictional interference. This is particularly true of intermeshing gears in an automobile transmission and for this reason it is desirable that the final manufacturing operations on the pairs of gears of the transmission which are to intermesh be carried out concurrently so that the two gears may be more perfectly adapted one to the other.

The machine shown herein is one which has been designed particularly for testing the large bevel gear of the rear axle differential and the drive pinion therefor.

Referring to the accompanying drawing, the gear testing mechanism is mounted on a suitable supporting stand 1 and has a head 2 forming a support for the driving spindle which is slidably mounted upon a bed 3 at the top of the supporting stand 1. The head 2 is adapted to be adjusted forwardly or rearwardly by means of a lead screw 4 which has a threaded engagement with a projection 5 upon the underside of the head 2. The lead screw 4 extends to the front of the supporting stand and has fixed thereto a suitable hand wheel 6 which preferably has a graduated periphery and a fixed pointer 7 cooperating with the graduations on the periphery to indicate the angular adjustment of the hand wheel. By means of the lead screw with its graduated hand wheel, the spindle supporting head 2 may be very accurately adjusted. It is desirable that the head 2 be rigidly locked in its adjusted position so that the driven gear will be held against any longitudinal movement. For clamping the head 2 in adjusted position, a clamping plate 8 is provided beneath the bed 3 and is engaged by a vertical screw 9 which extends through a slot in the bed 3 and through the base of the head 2. The screw 9 is provided with a nut 10 at its upper end which is engaged by a link 11 which extends through a slot in the side wall of the head 2 and is connected to an operating handle 12. By pulling the handle 12 forwardly the link 11 is caused to rotate the nut 10 drawing the plate 8 into tight clamping engagement with the bed 3. The drive spindle head 2 is mounted in a suitable groove 3ª in the bed 3 and has a gib 13 extending along one side thereof in the groove, the gib 13 being secured to the base of the head and adjustable longitudinally thereof to properly align the head in the guide groove by means of an adjusting screw 14.

The head 2 is preferably a hollow box-like structure which is provided with a detachable cover 15 so that access may be had to the interior thereof. The front and rear walls of the head 2 are relatively thick and have aligned cylindrical bores adapted to receive bearing rings 16 and 17, the inner walls of which are oppositely tapered. The bearing rings 16 and 17 are provided with peripheral grooves 18 adapted to receive oppositely disposed tapered bearing rollers. Rigidly clamped within the bearing rings 16 and 17 is a tubular spindle 19 which has an enlarged tapered forward end 20 which fits within the forward bearing ring 16 and which is clamped within the rear bearing ring 17 by means of a tapered sleeve 21. The rear end of the spindle 19 is externally screw threaded and carries a nut 22 which engages the rear end of the tapered sleeve 21 and serves to force the sleeve 21 into clamping engagement between the tapered inner wall of the bearing ring 17 and to draw the tapered forward end 20 of the sleeve 19 into tight engagement with the tapered inner wall of the forward bearing ring 16. The interior of the tubular spindle 19 has a slight inward taper from its forward end and is adapted to receive a tapered clamping chuck 23 which is formed to receive the short stub shaft 24 of the differential drive pinion 25, the inner end of the clamping chuck being formed to provide a driving engagement with the squared reduced end of the stub shaft 24. Coupled to the chuck 23 is a shaft 26 which extends to the rear end of the tubular spindle 19 and has a threaded rear end which receives a nut 27 adapted to be tightened against washers 28 which bear upon the rear end of the spindle 19.

When the nut 27 and washers 28 are removed from the rear end of the shaft 26, the chuck 23 and shaft 26 can be removed bodily through the forward end of the tubular spindle. When the chuck 23 with the stub shaft 24 therein is inserted in the spindle 19 and the nut 27 tightened upon the rear end of the shaft 26, the gear spindle will be rigidly clamped to the spindle 19. In order that the spindle 19 may rotate freely and noiselessly, means are provided for maintaining a liberal supply of oil to the spindle supporting bearings through suitable oil conduits 29.

In axial alignment with the spindle 19 at the rear of the machine is a driven shaft 30 which has a squared tapered forward end 31 terminating in a threaded portion adapted to receive a nut 32 which clamps a cup-shaped coupling member 33 to the end of the shaft 30. The forward end of the coupling member 33 is open and longitudinal slots 34 extend rearwardly from the forward edge thereof to enable the coupling member to be contracted into locking engagement with the spindle 19. Clamping the coupling member 33 to the spindle 19 the forward end of the member 33 is provided with a forwardly tapered threaded end portion 35 adapted to be engaged by an internally tapered and threaded nut 36, which has suitable sockets 36ª in the periphery thereof to receive a spanner wrench. When the nut 36 is tightened on the end of the coupling member 33 the member 33 is contracted into clamping engagement with the rear end of the spindle 19. The shaft 30 is driven through a suitable telescopic flexible coupling 37 from a suitable motor 38, the telescopic driving connection 37 permitting the spindle 19 to be driven in the various adjusted positions of the spindle supporting head 2.

To enable the gear carrying chuck to be clamped to the spindle 19 and to enable the spindle 19 to be coupled to the driving shaft 30, means are provided for locking the spindle 19 against rotation to permit adjustment of the nuts 27 and 36. To this end a locking disk 39 is fixed to the spindle 19 within the hollow head 2 between the bearing rings 16 and 17. The disk 39 is provided with a row of openings 39ª adapted to receive a locking pin 40 which is slidably mounted in the rear wall of the driving head 2. At its forward end the supporting stand 1 is provided with two pairs of supporting standards, the standards 41 being positioned on one side of the axis of the driven spindle 19 and the other pair of standards 42 being positioned on the opposite side of the axis of the spindle 19. On the upper ends of the standards 41 there are spaced horizontally extending cylindrical casing members 43 and 44 in which there is slidably mounted a sleeve 45 which is held against rotation by means of a rib 45ª engaging a longitudinal groove on the interior of the casing member 43. The slidable sleeve 45 is provided with an external helical groove 46 and rotatably mounted upon the slidable sleeve 45 and between the casing members 43 and 44 is a sleeve 47 to which is rigidly attached a hand wheel 48. Projecting from the inner wall of the rotary sleeve 47 are pins or lugs 49 which engage in the helical groove 46 of the slidable sleeve 45. When the sleeve 47 is rotated by means of the hand wheel 48, the lugs 49 are caused to travel in the helical groove 46 and impart a longitudinal movement to the sleeve 45. To obtain accurate adjustments of the sleeve 45, the hand wheel 48 is provided with a graduated periphery and a fixed pointer 50 overlying the graduated periphery thereof serves to indicate the angular adjustment of the hand wheel. The pair of uprights 42 on the opposite side of the supporting stand carries cylindrical casing members 51 and 52 which are horizontally disposed in axial alignment with the casing members 43 and 44. Within the casing members 51 and 52 there is a slidable and nonrotatable sleeve 53 which is held against rotation in the same manner as the sleeve 45. The sleeve 53 has a helical groove 54 and the sleeve 53 may be adjusted longitudinally by means of a rotary sleeve 55 thereon, between the spaced casing members 51 and 52, which has fixed thereto a hand wheel 56 and carries interior lugs or pins 57 which engage in the groove 54. Journaled in the casing member 43 at its outer end is a shaft 58, the inner end of which is tubular and has a telescopic driving engagement with a spindle 59 which is rotatable within the sleeve 45 and held against longitudinal movement with respect thereto. The spindle 59 is held against longitudinal movement with respect to the sleeve 45 by means of a roller thrust bearing 60 carried by the casing member 44, the spindle 59 having a shoulder 61 engaging the inner side of the inner bearing ring and having fixed thereto a chuck plate 62 engaging the outer side of the bearing. The spindle 59 projects beyond the back chuck plate 62 and has a squared outer end 59ª adapted to have a telescopic driving engagement with the chuck plate 63 carried by a thrust bearing member 64 journaled within the inner end of the slidable sleeve 53. The chucks 62 and 63 are formed to engage opposite ends of a differential gear case 65 and the projecting portion of the spindle 59 is formed to pass through the gear case 65 and have a driving engagement therewith. By adjusting the sleeves 45 and 53 the gear case 65 may be rigidly clamped between them in a position such that the external bevel gear 65ª will be in proper alignment with the driving pinion 25. By adjusting the sleeves 45 and 53 to the right or left the position of the gear 65ª with respect to the axis of the driven spindle 19 may be very accurately adjusted. The shaft 58 at the outer end of the casing member 43 projects beyond the outer end of the member 43 and has fixed thereto a brake drum 66 which is surrounded by a suitable brake band 67 supported upon a pivot bracket 68 attached to the rear side of the casing member 43. The free ends of the brake band 67 are at the front of the brake drum and the brake band is adapted to be tightened to the brake drum by means of a hand lever 69 which is pivoted to the lower free end of the brake band. The lever 69 operates a tension rod 70 which is slidable in a lug 71 carried by the upper free end of the brake band and has a pivotal connection 72 with the lever 69. A tension coil spring 73 is interposed between the lug 71 and an adjusting nut 74 adjacent the lower end of the rod 70. The upper end of the rod 70 is threaded and carries a nut 75 which bears against the upper side of the lug 71. The tension spring 73 serves to normally separate the free ends of the brake band and hold the brake band out of engagement with the brake drum 66, however, when pressure is exerted upon the outer end of the lever 69, the brake band 67 is tightened upon the drum 66.

In the operation of the machine the driving and driven spindles are so adjusted as to bring the bevel gears 25 and 65ª into proper mesh. The spindle 19 carrying the gear 25 is driven and varying loads are applied to the gear carrying spindle 59 by means of the manually operable brake. The brake drum 66 is preferably provided with a handle 76 on its outer side by means of which the spindle 59 may be turned manually to determine the amount of back lash between the gears as will now be explained.

In order to enable the gears being tested to be properly adjusted with respect to each other for the test, means have been provided for accurately measuring the amount of play or back lash between the gears in any position of relative adjustment while in mesh. To this end an indicator carrying rod 77 is pivotally mounted upon a bracket 78 fixed to the driven spindle head 2 and a suitable indicating device 79 is adjustably connected to the rod 77 by means of an adjustable clamp 80. The indicating device is of a well known type in which the movement of an actuating part which is engageable with the work is communicated, by means of suitable operating connections, to a pointer which moves over a graduated dial. The indicating device 79 is pivotally connected to the clamp 80 and when the rod 77 is swung down over the gears being tested, the operating part 81 of the indicator 79 may be brought into engagement with one of the teeth of the large gear. The member 81 actuates a pointer which cooperates with a suitable dial 82 on the face of the indicator 79 so that when the gear 65ª is turned by means of the handle 76, the amount permitted by the play or back lash between the teeth of the gear 65ª and gear 25, the amount of this back lash will be indicated upon the dial 82. The indicating device, per se being an old and well known device the details thereof have not been shown. Before driving the gears, it is desirable that they be accurately adjusted with respect to each other and this adjustment may be accurately determined by means of the indicating device above described. In testing, the two gears being tested may be coated with a suitable paint so that after they have been driven one upon the other, teeth having imperfect engagement with each other may be noted and properly finished to provide correct driving engagement. The most important test, however, is the audible test to determine whether or not the gears operate smoothly without vibration and frictional interference. To facilitate the audible test it is desirable that all the noises from external sources be excluded. To this end the motor for driving the driven spindle is preferably located behind a sound deadening wall such as the wall 83 shown in Fig. 1. The bearings for the spindles should be accurately turned and well lubricated so that the rotation of the spindles will be noiseless.

In addition, means have been provided for intensifying the sound produced by the gears when driven one upon the other so that sounds which would ordinarily be indistinguishable, may be readily detected by the operator. To this end the supporting stand 1 immediately beneath the driven head supporting bed 3 is provided with a hollow chamber 84 which has an opening 85 at the top thereof immediately beneath the gears being tested and has openings 86 in the sloping side walls thereof. The chamber 84 forms a resonance chamber and serves to greatly intensify sounds produced by the gears being tested.

Having described my invention, I claim—

1. A gear testing machine comprising rotatable relatively adjustable supporting members for a pair of gears, means for holding said members in a position in which the gears carried thereby are in mesh, means for driving one of said members, and means adjacent the intermeshing gears for intensifying sounds produced by the gears.

2. A gear testing machine comprising a pair of spindles each having means for detachably holding a gear, means for adjusting one spindle toward and from the other to cause the gears to mesh, means for driving one of the spindles, and a support for said spindles, said support having a portion adjacent the intermeshing gears forming a resonance chamber.

3. A testing machine for intermeshing gears comprising a pair of adjustable spindles having means for detachably holding gears to be tested, means for securing said spindles in positions of adjustment with the gears carried thereby in mesh, and a hollow box-like supporting stand for said spindles, said stand having an opening adjacent the gears being tested, said stand forming a resonance chamber.

4. A gear testing machine, comprising a rotatable gear supporting member, braking means associated with said rotatable member, a driven gear supporting spindle adjustable toward and from said rotatable member to bring the gear thereon into mesh with the gear on the rotatable member, a hollow box-like support beneath said spindle, said box-like support having an opening adjacent the gears being tested, said support forming a resonance chamber.

5. A gear testing machine comprising rotatable relatively adjustable supporting members for a pair of gears, means for securing said members in a position in which the gears carried thereby are in mesh, a motor having a driving connection with one of the gear supporting members, sound deadening means between the motor and intermeshing gears, and means adjacent the intermeshing gears for intensifying sounds produced by the gears.

6. A gear testing machine comprising a pair of rotatable gear carrying members which are relatively adjustable to permit the gears to be moved into or out of mesh, a motor having a driving connection with one of said gear supporting members, a sound deadening wall between the motor and intermeshing gears, and a resonance chamber adjacent the intermeshing gears.

7. A testing machine for intermeshing bevel gears, comprising a rotatable member for holding one of the gears, a support therefor, a rotatable longitudinally adjustable spindle adapted to support the other of the gears at its outer end with its axis at an angle to the axis of the first gear, a motor, a shaft driven by the motor and having a detachable connection to the spindle, a sound deadening wall between the motor and spindle support, and a resonance chamber associated with the spindle support for intensifying sounds produced by gears being tested.

8. A testing machine for intermeshing bevel gears comprising a rotatable member for holding one of the gears, a support therefor, a supporting stand on which said support is mounted, a head slidable on said stand in a direction at an angle to the axis of rotation of said member, a spindle extending through said head and adapted to support a bevel gear at its inner end, means for preventing longitudinal movement of the spindle with respect to the head, a drive shaft at the rear of the head, a detachable coupling for connecting the drive shaft to the spindle, and means for locking the spindle against rotation to facilitate the connection and disconnection of the coupling.

9. A testing machine for intermeshing gears, comprising a rotatable member for holding one of the gears, a support for said rotatable member, a supporting stand on which said support is mounted, a hollow head slidable on said stand toward and from said rotatable member, aligned oppositely tapered bearings in opposite walls of the head, a tapered spindle mounted in said bearings, gear supporting means at the forward end of the spindle, means on the rear end of the spindle for tightening the spindle in the bearings, a drive shaft at the rear of the head aligned with the head and means for detachably coupling the spindle to the drive shaft.

10. A testing machine for differential driving gears, a support for the differential gear case and external gears comprising separated aligned spindles adapted to be moved toward and from each other and to clamp a gear case between them, a head movable in a direction at right angles to the axis of aligned spindles, a spindle rotatably mounted in the head and held against longitudinal play therein, said spindle having a socket to receive the stub shaft of the differential driving gear, an adjusting screw for said head, a clamp for locking the head in adjusted position, and means for driving said spindle.

11. In a gear testing machine, a supporting member comprising a cylindrical casing having a fixed and a rotatable portion, a sleeve slidably and nonrotatably mounted within the casing, a spindle journaled within the sleeve and projecting beyond one end thereof, said spindle being movable longitudinally with the sleeve, said sleeve having an external helical groove, a hand wheel attached to the rotatable portion of the casing, and a lug upon the inner face of the rotatable portion of the casing engaging in said groove.

12. In a gear testing machine, a supporting member comprising a pair of uprights carrying horizontally disposed aligned and spaced cylindrical casing members, a shaft rotatable mounted in one end of one of said casing members, a brake associated with said shaft, an externally threaded sleeve slidably and non-rotatably mounted in the casing members, a nut on said sleeve between the spaced casing members, and a spindle rotatably mounted in the sleeve and movable longitudinally therewith, said spindle having a telescopic connection with said brake carrying shaft.

13. In a gear testing machine, a gear holder comprising a pair of axially aligned relatively movable rotatable clamping members one of said clamping members having a spindle attached thereto, said spindle having a telescopic driving engagement with the other clamping member.

14. In a gear testing machine, a gear holder comprising a pair of axially aligned relatively movable rotatable clamping members, a brake member, and a spindle carried by one of said clamping members, said spindle having a telescopic driving engagement with the other clamping member and with the brake member.

15. In a gear testing machine, a pair of gear supporting spindles, means for adjusting one of the spindles toward and from the other to bring the gears into mesh and to vary the engagement thereof, a testing device for indicating the amount of back lash between the intermeshing gears, means for driving one of the spindles, and a brake associated with the other of the spindles.

16. In a gear testing machine, a pair of relatively adjustable supporting spindles, means for adjusting the spindles and locking the same in positions in which the teeth of the gears intermesh with varying amounts of back lash, indicating means associated with the gear supports for indicating the amount of back lash between the gears, means for driving one of the spindles, means for applying varying resistance to the rotary movement of the other spindle, and means for intensifying the sound produced by the intermeshing gears when driven.

In testimony whereof I hereunto affix my signature.

DAVID F. DOMIZI.